(12) United States Patent
Fujiwara et al.

(10) Patent No.: US 7,368,186 B2
(45) Date of Patent: May 6, 2008

(54) MASTER CARRIER FOR MAGNETIC TRANSFER (75) Inventors: Naoto Fujiwara, Kanagawa (JP); Seiji Kasahara, Kanagawa (JP); Kazuhiro Niitsuma, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 390 days.

(21) Appl. No.: 10/897,162

(22) Filed: Jul. 23, 2004

(65) Prior Publication Data
US 2005/0018335 A1    Jan. 27, 2005

(30) Foreign Application Priority Data
Jul. 25, 2003    (JP)    ............... 2003-280404

(51) Int. Cl.
*G11B 5/65* (2006.01)
*G11B 5/02* (2006.01)

(52) U.S. Cl. .................. 428/836; 360/16; 360/135

(58) Field of Classification Search ........... 428/697, 428/64.5, 831, 831.2, 840, 840.1, 840.2, 428/836, 848.4, 848, 846.9, 846.3; 360/903, 360/15, 16, 17, 134, 135, 136, 48; 285/89; 411/10, 138, 147, 150, 170, 197, 371.1, 371.2, 411/544, 545, 531, 929.2, 943, 963, 990
See application file for complete search history.

(56) References Cited

U.S. PATENT DOCUMENTS

| 6,074,126 A * | 6/2000 | Hunter et al. ............... 403/404 |
| 6,347,016 B1 * | 2/2002 | Ishida et al. .................. 360/17 |
| 2003/0123170 A1 | 7/2003 | Miyata et al. |

FOREIGN PATENT DOCUMENTS

| EP | 0 915 456 A1 | 5/1999 |
| JP | 10-40544 A | 2/1998 |
| JP | 11-161956 A | 6/1999 |

* cited by examiner

*Primary Examiner*—Carol Chaney
*Assistant Examiner*—Louis Falasco
(74) *Attorney, Agent, or Firm*—Sughrue Mion, PLLC (57) ABSTRACT

The master carrier for magnetic transfer of the invention comprises a support and a magnetic layer formed on the surface of the support, wherein an uneven transfer pattern that corresponds to the information to be transferred to a magnetic recording medium is formed in the surface of the magnetic layer, and a relief is formed in the site where the transfer pattern is not formed.

6 Claims, 7 Drawing Sheets

MASTER CARRIER FOR MAGNETIC TRANSFER

BACKGROUND OF THE INVENTION

1. Field of the Invention

The present invention relates to a master carrier for magnetic transfer, which has a magnetic layer with a transfer pattern formed therein for transferring information data to a magnetic recording medium.

2. Description of the Related Art

Increasing the recording density of magnetic recording media is now in great progress so as to satisfy the requirement for the increase in information contents of today. In a magnetic recording medium having a high recording density, the information-recording region has a narrow track. In order to precisely trace a magnetic head along such a narrow track to thereby reproduce signals at a high S/N ratio, a tracking servo technique for magnetic heads is an important theme.

In order that a magnetic head could trace along the recording track of a magnetic recording medium, the recording medium must be preformatted with the necessary servo information that includes positioning servo signals, tracking address signals and regeneration clock signals, while it is produced.

For preformatting magnetic recording media, a dedicated servo-write device (servo track writer) is used at present. With it, however, a magnetic head must be scanned on every magnetic recording medium for preformatting it one by one, and it takes a long period of time. Therefore, for increasing the productivity in preformatting, a large number of servo-write devices must be driven all at a time. However, introduction and maintenance of such a large number of servo-write devices is expensive.

It is anticipated that increasing the recording density of magnetic recording media will be in greater progress in future and the track density thereof will therefore further increase.

In that situation, a study of magnetic transfer is now in progress, which comprises keeping the surface of a magnetic recording medium that has a magnetic recording region in its surface, in intimate contact with the surface of a master carrier that has a transfer pattern of servo signals and others formed of a magnetic material on the surface of a support thereof, and applying a transfer magnetic field to the master carrier in that condition to thereby magnetically transfer the transfer pattern of the master carrier to the magnetic recoding medium all at a time.

When the magnetic recording media referred to hereinabove are disc-shaped ones such as hard discs or high-density flexible discs, then a disc-shaped master carrier is kept in intimate contact with one or both faces of the magnetic recording medium of the type and, in that condition, a transfer magnetic field is applied to one or both surfaces thereof by the use of a magnetic field applicator with electromagnets or permanent magnets (for example, see U.S. Pat. No. 6,347,016).

For correctly transferring and recording a transfer pattern of a master carrier to a magnetic recording medium (slave medium) in a mode of magnetic transfer, it is important to apply a magnetic field to the magnetic recording medium while it is in uniform and intimate contact with the master carrier.

Figure 8:
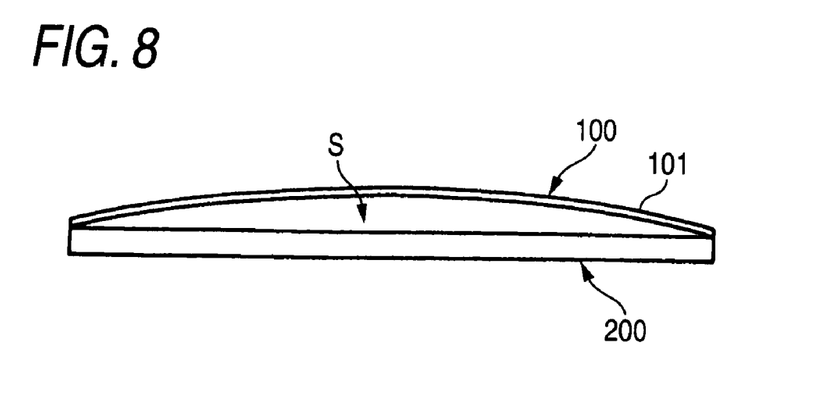
FIG. 8 is an explanatory view schematically showing a conventional master carrier and a magnetic recording medium that are put on top of each other.

FIG. 8 is an explanatory view schematically showing a conventional master carrier 100 and a magnetic recording medium 200 that are put on top of each other. As in FIG. 8, when there exists a space S between the master carrier 100 and the magnetic recording medium 200, then the fine uneven transfer pattern (not shown) provided in the transfer region of the master carrier 100 could not be in uniform and intimate contact with the magnetic recording region formed in the surface of the magnetic recording medium 200 and therefore the transfer pattern could not be correctly transferred to the magnetic recording region.

The cause of the space S would be that the warp or distortion occurred in the master carrier 100 may be high-ordered when kept in intimate contact, and the support 101 of the master carrier 100 is thereby deformed, and the face of the support 101 is curved.

Figure 9:
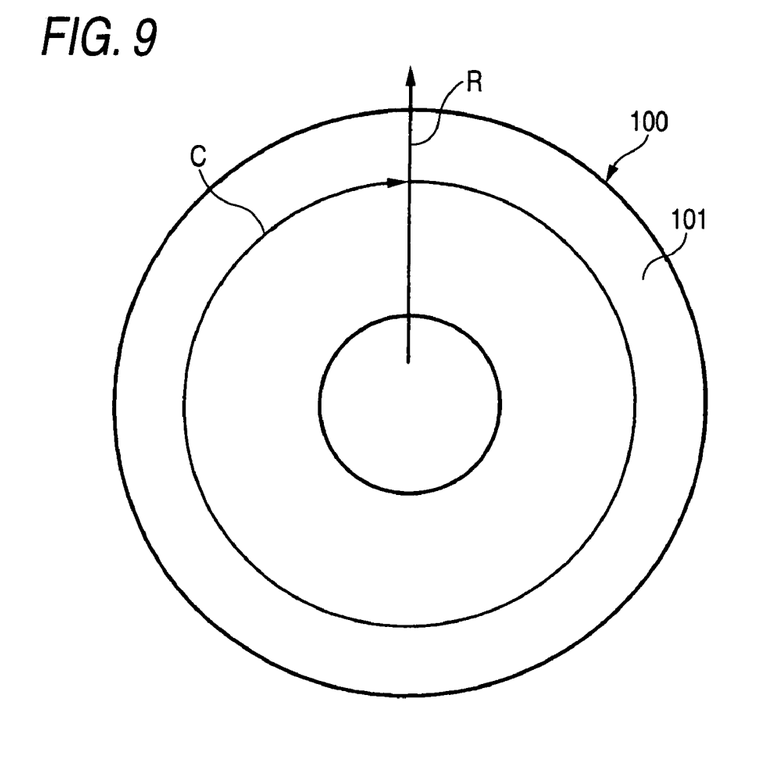
FIG. 9 is a plan view of the master carrier of FIG. 8, seen on its top.
Figure 10:
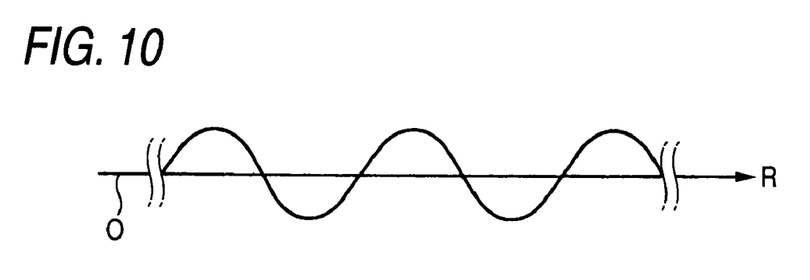
FIG. 10 is a graphical view showing the warp of a conventional master carrier in the radial direction thereof.
Figure 11:
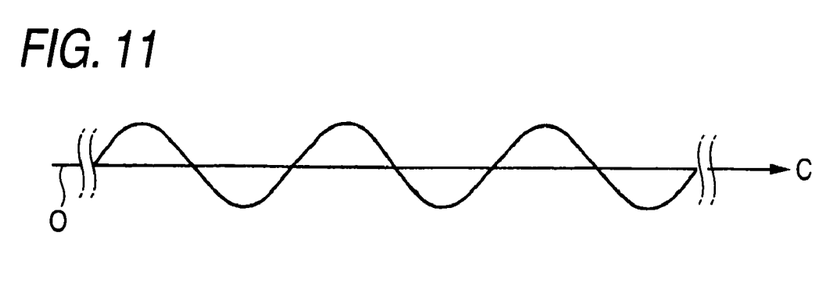
FIG. 11 is a graphical view showing the distortion of a conventional master carrier in the peripheral direction thereof.

FIG. 9 is a plan view of the master carrier 100 of FIG. 8, seen on its top. FIG. 10 is a graphical view showing the warp of the master carrier 100 of FIG. 9, in the radial direction thereof (in the direction of the arrow R in the drawing). FIG. 11 is a graphical view showing the distortion of the master carrier 100 of FIG. 9, in the peripheral direction thereof (in the direction of the arrow C in the drawing).

"Warp" as referred to herein means the displacement of the support surface in the radial direction of the master carrier, as in FIG. 9 and FIG. 10. "Distortion" also referred to herein means the displacement of the support surface in the circumferential direction of the master carrier, as in FIG. 9 and FIG. 11.

Heretofore, a magnetic field is applied to a magnetic recording medium and a master carrier that are in uniform and intimate contact with each other while an external load is applied there to so as not to form a clearance gap between the two. However, since the master carrier is warped or distorted by itself, it is extremely difficult to ensure uniform and intimate contact between the mater carrier and the magnetic recording medium attached thereto.

On the other hand, it was impossible to completely remove warp and distortion from master carriers in view of the process of producing them.

For these reasons, there occurs a space between the magnetic recording medium and the master carrier that are kept in contact with each other, owing to the high-ordered warp and distortion of the master carrier, and, as a result, the transfer efficiency is lowered and magnetic recording media could not be correctly preformatted. In this point, there is still room for improvement in the transfer technique.

SUMMARY OF THE INVENTION

The present invention has been made in consideration of the above-mentioned situation, and its object is to provide a master carrier for magnetic transfer, which can be in intimate and improved contact with a magnetic recording medium attached thereto to attain good transfer efficiency.

The above-mentioned object of the invention can be attained by a master carrier for magnetic transfer which comprises a support having an uneven transfer pattern that corresponds to the information to be transferred to a magnetic recording medium and a magnetic layer formed on the surface of the support, wherein a relief is formed in the site where the transfer pattern is not formed. The term "relief" as used herein means that a portion where the uneven transfer pattern is not formed, and it is formed by thinning a thickness of the master carrier in a perpendicular direction of the master carrier at opposite sides of the surface having the uneven transfer pattern.

The master carrier for magnetic transfer (hereinafter this is simply referred to as "master carrier") of the invention is so designed that its support in the site where the relief is formed is thinner than in the other site where no relief is formed. Therefore the master carrier is not so rigid and can be readily deformed owing to the defection of the support.

Accordingly, even when the support of the master carrier has warp and distortion, the deflection thereof caused by the warping or distortion may concentrate in the relief and, as a result, the support may be deformed only in the site where the relief is formed. In other words, even if the support of the master carrier is warped or distorted while the master carrier is kept in intimate contact with a magnetic recording medium attached thereto, the deflection of the support caused by the warping or distortion thereof may concentrate in the relief or, that is, the warp and the distortion may be thereby allowed. Accordingly, the transfer pattern-having site of the master carrier that is in direct contact with a magnetic recording medium is prevented from being deflected and, as a result, the master carrier may be kept in uniform and intimate contact with the magnetic recording medium attached thereto.

Accordingly, the master carrier for magnetic transfer of the invention ensures good and intimate contact with a magnetic recording medium attached thereto, and therefore ensures good transfer efficiency. The master carrier of the present invention and the method using the same are specifically described below.

(1). A master carrier for magnetic transfer, including: a support having an uneven transfer pattern on a surface of the support, the uneven transfer pattern corresponding to information to be transferred to a magnetic recording medium; and a magnetic layer on the surface of the support, wherein the master carrier has a relief in a site where the uneven transfer pattern is not formed, the relief being formed by thinning a thickness of the master carrier in a perpendicular direction of the master carrier at opposite sides of the surface having the uneven transfer pattern.

(2). The master carrier for magnetic transfer of item 1, wherein the relief extends from inside to outside in a radial direction of the master carrier.

(3). The master carrier for magnetic transfer of item 1, wherein the relief spreads with extending to outside in a radial direction.

Figure 12:
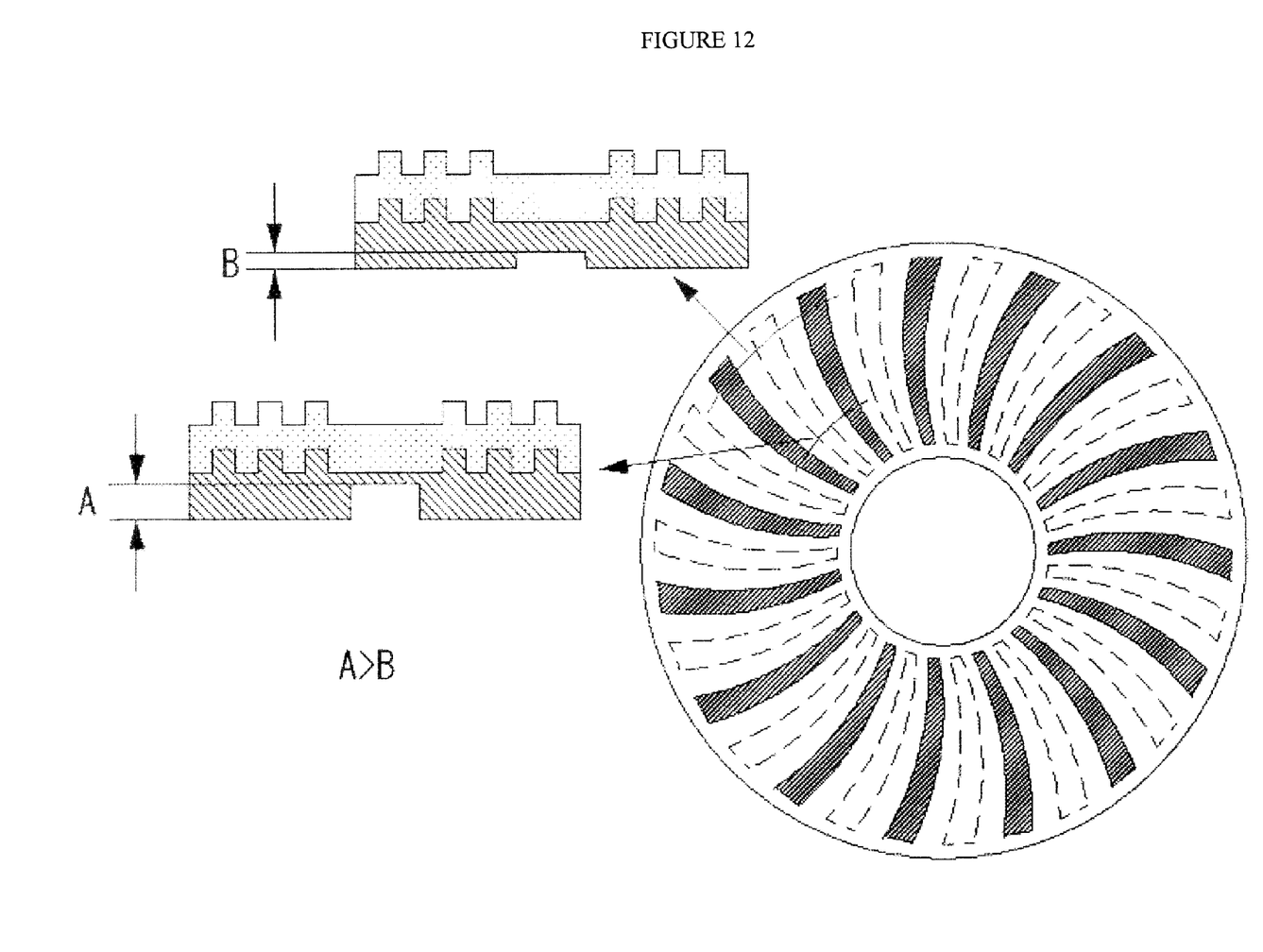
FIG. 12 is an explanatory view showing a master carrier, wherein a thickness of said master carrier is said relief gradually decreases with extending to outside in a radial direction.

(4). The master carrier for magnetic transfer of item 1, wherein a thickness of the master carrier in the relief gradually decreases with extending to outside in a radial direction. (See FIG. 12).

(5). The master carrier for magnetic transfer of item 1, wherein a thickness of the master carrier in the relief gradually increases with extending to outside in a radial direction.

(6). A master carrier for magnetic transfer, including: a support having an uneven transfer pattern on a surface of the support, the uneven transfer pattern corresponding to information to be transferred to a magnetic recording medium; and a magnetic layer on the surface of the support, wherein the master carrier has a through-hole in a site where the uneven transfer pattern is not formed, the through-hole running through in a perpendicular direction of the master carrier.

(7). The master carrier for magnetic transfer of item (6), wherein the through-hole extends from inside to outside in a radial direction of the master-carrier.

(8). A master carrier for magnetic transfer, including: a support having an uneven transfer pattern on a surface of the support, the uneven transfer pattern corresponding to information to be transferred to a magnetic recording medium; and a magnetic layer on the surface of the support, wherein the master carrier has a slit in a site where the uneven transfer pattern is not formed, and the slit runs through in a direction of a perpendicular direction of the master carrier and extends from inside to outside in a radial direction of the master carrier, the slit being so formed that it breaks one of an outer periphery and an inner periphery of the support in a peripheral direction of the master carrier.

(9). A process of producing a preformatted magnetic recording medium, which comprises the steps of:

preparing a master carrier, preparing a slave medium including a non-magnetic support having a magnetic recording layer thereon, initially magnetizing the magnetic recording layer of the slave medium to a predetermined direction, bringing a surface of the master carrier into intimate contact with the magnetic recording layer of the slave medium at a predetermined pressure to form a conjoined body, and applying a transfer magnetic field to the conjoined body in a direction opposite to the predetermined direction, thereby obtaining the magnetic recording medium having the recorded data, wherein the master carrier, which comprises a support having an uneven transfer pattern on a surface of the support, the uneven transfer pattern corresponding to information to be transferred to the slave medium; and a magnetic layer on the surface of the support, has a relief in a site where the uneven transfer pattern is not formed, the relief being formed by thinning a thickness of the master carrier in a perpendicular direction of the master carrier at opposite sides of the surface having the uneven transfer pattern.

(10). The process of producing a preformatted magnetic recording medium of item (9), wherein the relief extends from inside to outside in a radial direction of the master carrier.

(11). The process of producing a preformatted magnetic recording medium of item (9), wherein the relief spreads with extending to outside in a radial direction.

(12). The master carrier for magnetic transfer of item (9), wherein a thickness of the master carrier in the relief gradually decreases with extending to outside in a radial direction.

(13). The master carrier for magnetic transfer of item (9), wherein a thickness of the master carrier in the relief gradually increases with extending to outside in a radial direction.

The master carrier for magnetic transfer of the invention can be in intimate and improved contact with a magnetic recording medium attached thereto and attains good transfer efficiency.

DETAILED DESCRIPTION OF THE INVENTION

Embodiments of the invention are described in detail here in under with reference to the drawings attached hereto.

Figure 1:
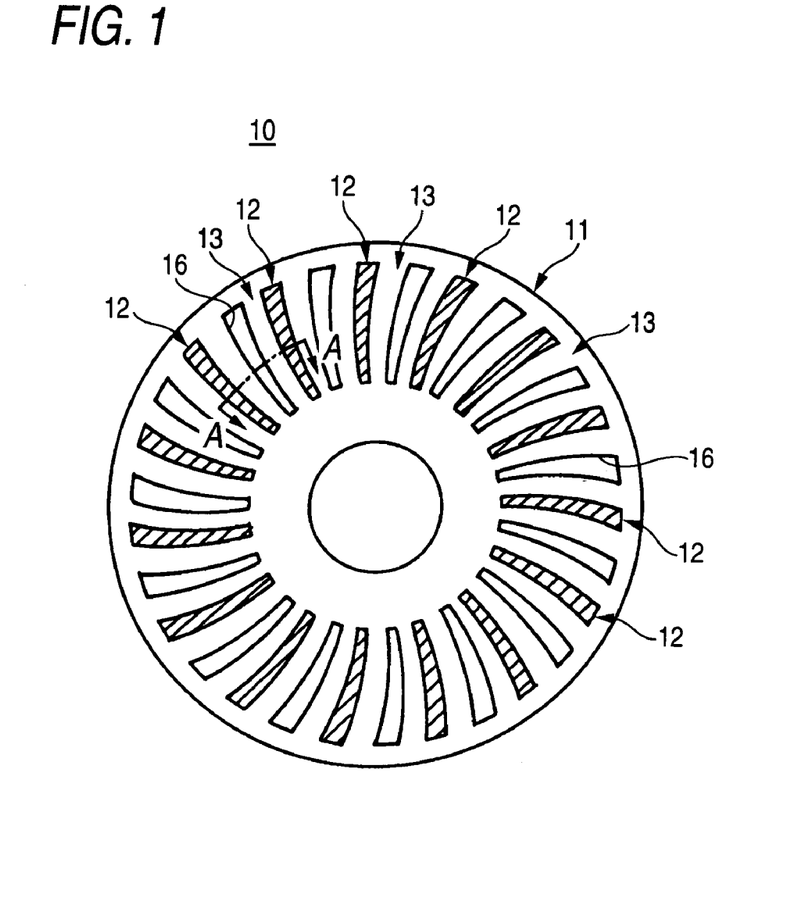
FIG. 1 is an explanatory plan view schematically showing a first embodiment of the master carrier for magnetic transfer of the invention.
Figure 2:
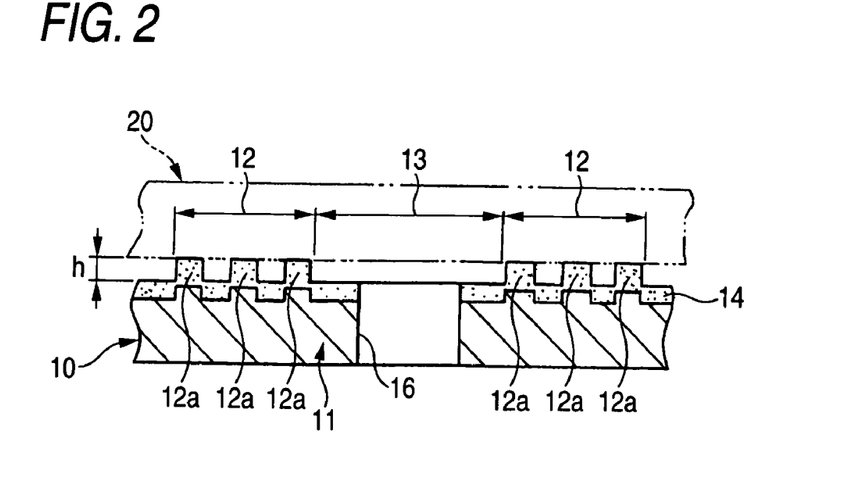
FIG. 2 is an explanatory cross-sectional view schematically showing the cross section of the master carrier for magnetic transfer of FIG. 1, cut along the line A-A.
Figure 3:
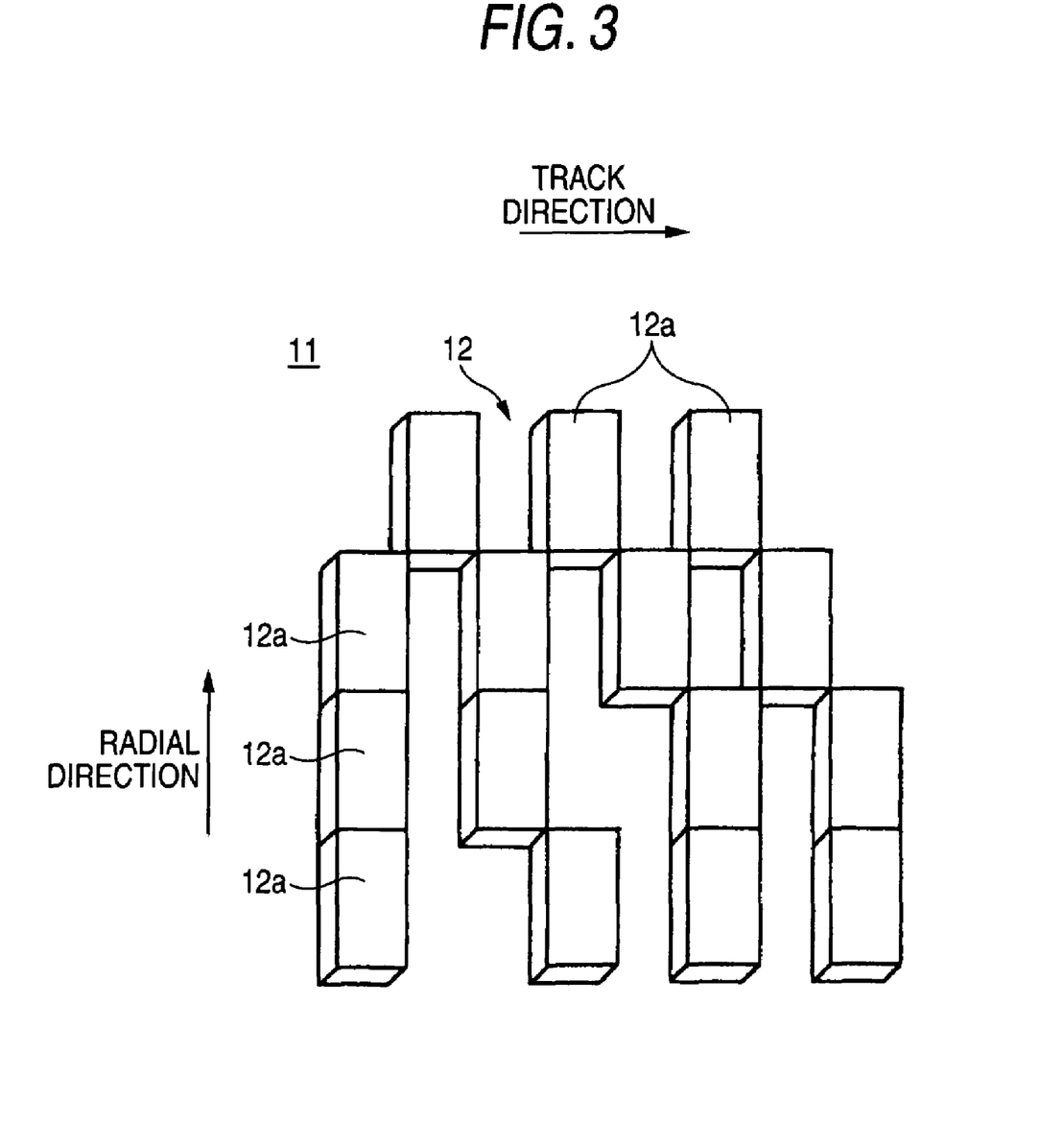
FIG. 3 is an explanatory view graphically showing the transfer pattern of the transfer region of the master carrier.

FIG. 1 is an explanatory plan view schematically showing a first embodiment of the master carrier for magnetic transfer of the invention. FIG. 2 is an explanatory cross-sectional view schematically showing the cross section of the master carrier for magnetic transfer of FIG. 1, cut along the line A-A. FIG. 3 is an explanatory view graphically showing the transfer pattern of the transfer region of the master carrier.

As in FIG. 1 to FIG. 3, the master carrier 10 is formed like a disc, and its surface has a plurality of transfer regions 12 each having a transfer pattern of fine protruded portions 12a formed to correspond to the information signals to be transferred to a magnetic recording medium 20 shown by the broken line in FIG. 2, and a non-transfer region 13 where these protruded portions 12a are not formed. In FIG. 1, the transfer regions 12 are hatched.

In the center of the support 11, a circular opening is formed to run through in the direction of the thickness of the support 11, and this is for registration in transfer to the magnetic recording medium 20.

Plural transfer regions 12 all extend in strips from around the center of the master carrier 10 toward the peripheral edge thereof in the radial direction, and they are formed in the surface of the master carrier 10 at a predetermined angle relative to the peripheral direction thereof.

As in FIG. 2, when the magnetic recording medium 20 is disposed adjacent to the surface of the master carrier 10 for magnetic transfer to it, then the upper faces of the protruded portion 12a are kept in intimate contact with the recording region of the magnetic recording medium 20.

The information signals to be transferred are, for example, tracking servo signals, clock signals and address information signals, but are not limited to these. The pattern of fine protruded portion 12a is suitably designed in point of its disposition, in accordance with the information to be transferred to the magnetic recording medium.

As in FIG. 2, the master carrier 10 comprises the disc-like support 11 formed of a magnetic material, and a magnetic layer 14 formed on the surface of the support 11. In this embodiment, the magnetic layer 14 is formed on the entire surface of the support 11. Not limited to this, however, the magnetic layer 14 may be formed at least on the protruded portion 12a in the transfer region 12.

Preferably, the fine protruded portion 12a is so designed that its height, h, from the surface of the support 11 in the site where the protruded portion 12a are not formed is from 5 nm to 1 μm. More preferably, the height, h, is from 20 nm to 300 nm.

The magnetic material of the support 11 and that of the magnetic layer 14 are so selected that the saturation magnetization, Ms, of the support 11 and the saturation magnetization, Mm, of the magnetic layer 14 may satisfy the relation of 1.0<Mm/Ms<100, preferably 2.0<Mm/Ms<3.9. The saturation magnetization, Ms, of the support 11 is at least 5.65 T (4500 Gauss). Concretely, the support 11 may be formed of Ni or an Ni alloy. The magnetic layer 14 may be formed of an alloy material such as FeCo, FeCoNi, FeNi or the like that has a face-centered cubic structure and contains at least one element selected from Fe, Co, Ni, Gd, Dy, Sm and Nd. Any other material that contains any other magnetic element or non-magnetic element may also be used herein so far as it is ferromagnetic as a whole. The magnetic layer may be a soft magnetic, semi-hard magnetic or hard magnetic one. Preferably, however, it is a soft magnetic or semi-hard magnetic layer having a small coercive force, as enabling better magnetic transfer.

Also preferably, the magnetic layer 14 to be formed on the support 11 has a body-centered cubic structure (bcc), a face-centered cubic structure (fcc), or an amorphous structure. When the magnetic layer 14 has a bcc structure or a fcc structure, then it is desirable that the layer has a packing structure of a number of irregularly-disposed fine particles and each particle therein has a size of at most 100 nm measured from the face of the layer.

The magnetic layer 14 may be formed by applying a magnetic material to the support in a mode of vacuum film formation such as vacuum deposition, sputtering or ion-plating, or though plating. Preferably, the thickness of the magnetic layer 14 is from 25 nm to 500 nm, more preferably from 80 nm to 300 nm.

Preferably, a protective film of diamond-like carbon (DLC) or sputtered carbon having a thickness of from 2 nm to 30 nm is formed on the surface of the magnetic layer. If desired, a lubricant layer may be formed thereon. Between the magnetic layer 14 and the protective film, an adhesiveness-enhancing layer of Si or the like maybe provided. While in contact with a magnetic recording medium, the master carrier may be incorrectly positioned, and when it is corrected, it may receive friction. The lubricant layer will be effective for preventing the master carrier from being scratched owing to the friction, and will be effective for improving the durability of the master carrier.

One example of the process of forming the support 11 in this embodiment is described.

First, an adhesiveness-enhancing liquid is applied to an Si support (for undercoating the support), and a resist liquid is applied thereto and baked. Next, the Si support is exposed for patterning (EBR), and then baked, and thereafter developed and further baked. Next, an Ni-conductive film is formed on it by sputtering for Ni-electroforming, and then this is peeled to give a base (base 1).

A replica of the base 1 is formed, and this is referred to as a base 2. Briefly, the base 1 is oxidized, then an Ni film is formed on it in a mode of Ni-electroforming, and then peeled, and the resist is removed to give the base 2. Further, a base 3 is formed from the base 2, and the same master base as the above base 1 is thus obtained.

Next, a protective film is formed on the pattern surface of each base, and optionally polished, and the polish powder formed in the polishing step is removed. Next, a protective film is also formed on the back of each base. Thus processed, the base is blanked into a piece having a desired size, and this is a master support. A magnetic layer mentioned above is formed on the master support.

In this embodiment, the master support is processed into a doughnut-like disc (center-holed disc), as in FIG. 1. Briefly, it is processed by blanking with a blanking machine equipped with an upper blade and a lower blade that engage with each other, or by photo etching, laser cutting, water cutting or lathing.

In the master carrier 10 of this embodiment, a plurality of through-holes 16 are formed in the non-transfer region 13 thereof not having the protruded portion 12a, and they all run through in the direction of the thickness of the support 11. These through-holes 16 each function as a relief.

As in FIG. 1, these through-holes 16 are formed in the non-transfer region 13, and, sandwiched between the adjacent transfer regions 12, each through-hole 16 extends almost radially from the center of the support 11 toward the outer peripheral edge thereof.

In the support 11, the site where the through-holes 16 are formed is thinner than any other site where the through-holes 16 are not formed, and therefore, the support 11 is not so rigid and may be readily deformed when it is deflected.

In this embodiment, even when the support 11 of the master carrier 10 is warped or distorted, the deflection thereof caused by the warping or distortion may concentrate around the through-holes 16 and the inner peripheral face of each through-holes 16 may suitably expand and contract, and, as a result, the support 11 may be deformed only in the site where the through-holes 16 are formed. In other words, even if the support 11 is warped or distorted while the master carrier 10 is kept in intimate contact with the magnetic recording medium 20 attached thereto, the deflection of the support 11 caused by the warping or distortion thereof may concentrate around the through-holes 16, and therefore the warp and the distortion may be thereby allowed. Accordingly, the transfer pattern-having site of the master carrier 10 that is in direct contact with the magnetic recording medium 20 is prevented from being deflected and, as a result, the master carrier 10 may be kept in uniform and intimate contact with the magnetic recording medium 20.

With respect to their shape, the through-holes 16 are not limited to those of this embodiment and may have any other shape so far as they may absorb the deformation caused by the deflection resulting from the warping or distortion of the support of the master carrier. For example, a plurality of through-holes that are circular in the plan view of the support may be formed at predetermined intervals in the non-transfer region 13.

Figure 4:
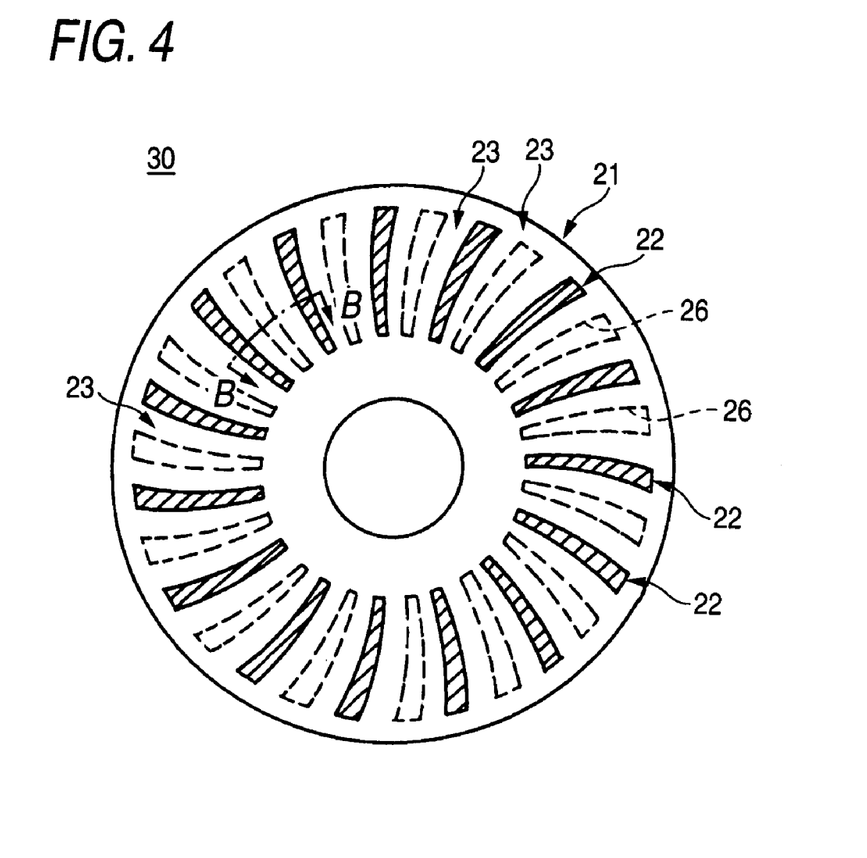
FIG. 4 is an explanatory plan view schematically showing a second embodiment of the master carrier for magnetic transfer of the invention.
Figure 5:
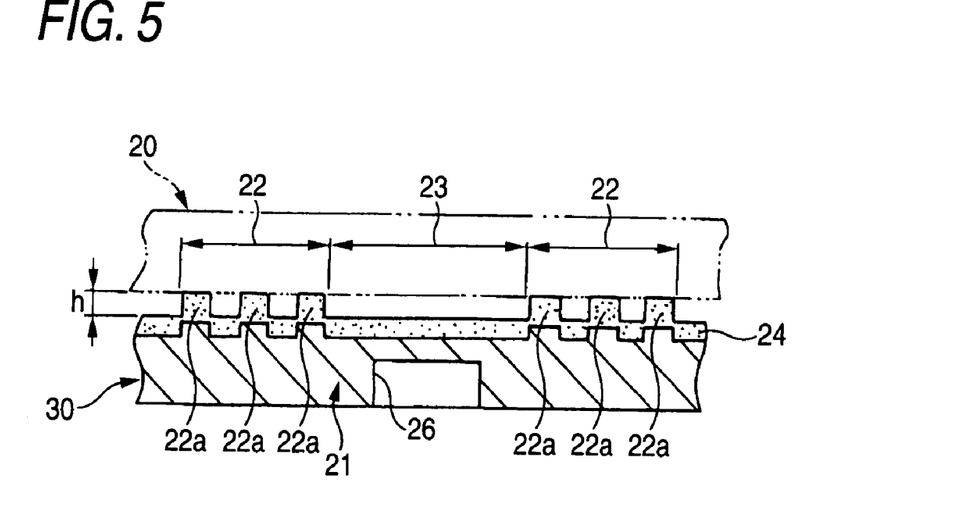
FIG. 5 is an explanatory cross-sectional view schematically showing the cross section of the master carrier for magnetic transfer of FIG. 4, cut along the line B-B.

Next described is a second embodiment of the invention. FIG. 4 is an explanatory plan view schematically showing a second embodiment of the master carrier for magnetic transfer of the invention. FIG. 5 is an explanatory cross-sectional view schematically showing the cross section of the master carrier for magnetic transfer of FIG. 4, cut along the line B-B. In the embodiments described here in under, the members that are the same as those already mentioned hereinabove in point of their constitution and function are designated by the same or corresponding numeral references, and their description is simplified or omitted.

As in FIGS. 4 and 5, the master carrier 30 of this embodiment is so designed that the support 21 thereof has recesses 26 formed in the face thereof opposite to the other face covered with a magnetic layer 24, or that is, the support 21 is thinned at the recesses 26. The recesses 26 each function as a relief.

In this embodiment, the site of the support 21 where the recesses 26 are formed is not so rigid as compared with the other site thereof where the recesses 26 are not formed. Accordingly, in this, even when the support 21 is warped or distorted, the deflection thereof caused by the warping or distortion may concentrate in and around the recesses 26 and the inner peripheral face and the bottom of each recess 26 may suitably expand and contract, and, as a result, the support 21 may be deformed only in the site where the recesses 26 are formed. Therefore, the master carrier 30 may be kept in uniform and intimate contact with the magnetic recording medium 20 attached thereto.

Figure 6:
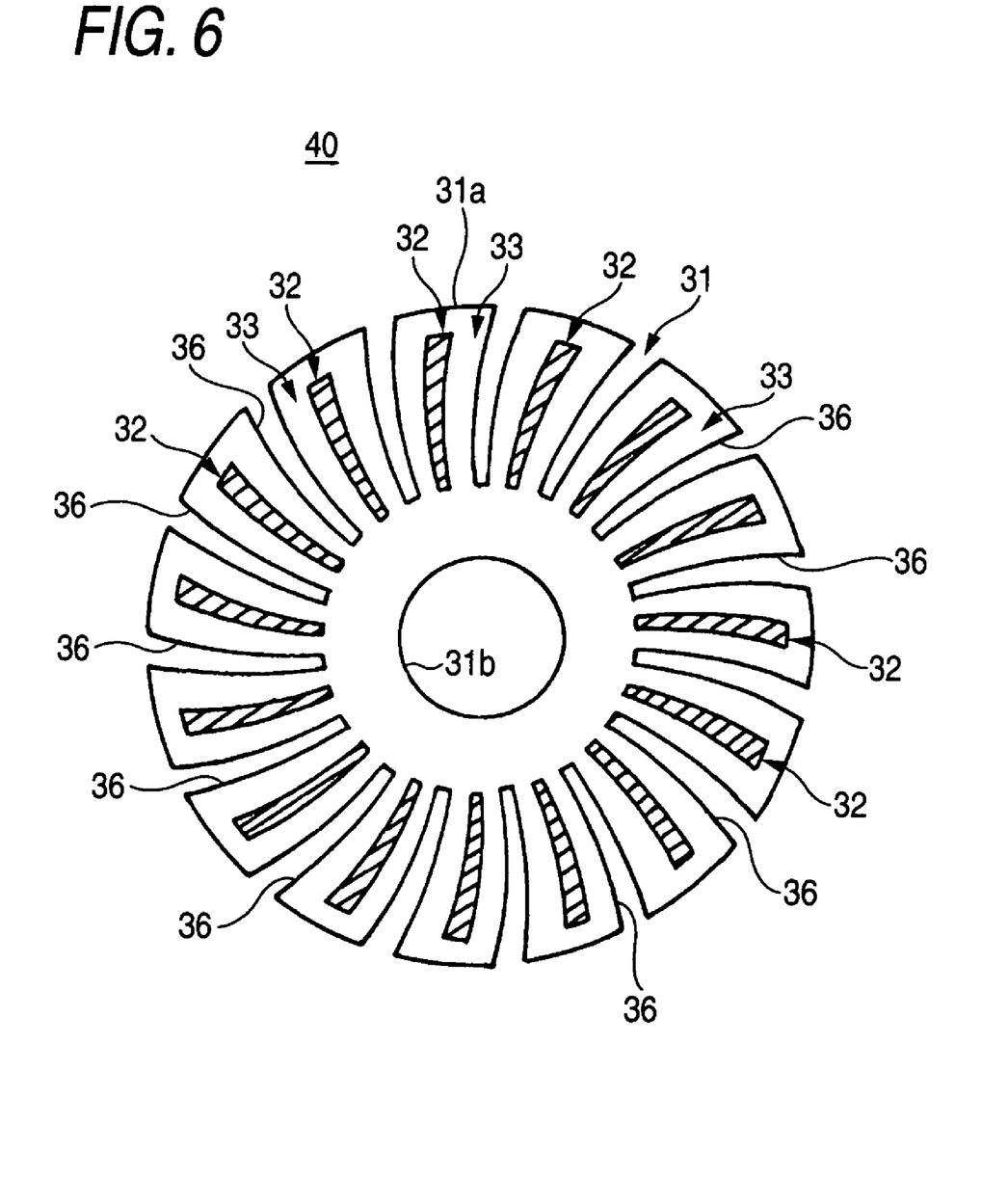
FIG. 6 is an explanatory plan view schematically showing a third embodiment of the master carrier for magnetic transfer of the invention.

Next described is a third embodiment of the invention. FIG. 6 is an explanatory plan view schematically showing a third embodiment of the master carrier for magnetic transfer of the invention.

As in FIG. 6, the master carrier 40 of this embodiment is so designed that the support 31 thereof has slits 36 each running through in the direction of the thickness of the support 31 and extending radially from the outer peripheral edge 31a of the support 31 toward the inner peripheral edge 31b thereof. The slits 36 each function as a relief.

In this embodiment, the site of the support 31 where the slits 36 are formed is not so rigid as compared with the other site thereof where the slits 36 are not formed. In addition, since the outer peripheral edge 31a of the support 31 is cut by the slits 36 at predetermined intervals in the peripheral direction thereof, the warp or distortion that may occur in the support 31 may be more efficiently relieved, and therefore the deformation to be caused by the warp or distortion is prevented from propagating to the transfer region 32. Accordingly, the master carrier 40 may be kept in uniform and intimate contact with the magnetic recording medium 20 attached thereto (see FIG. 2).

In this embodiment, the support 31 may be processed to have the slits 36 in such a condition that the non-transfer region 33 of the support 31 is removed to form the slits 36 while the inner peripheral edges 31b is left as such, within a range within which the thus-slit support 31 can still ensure the minimum necessary mechanical strength thereof.

Figure 7:
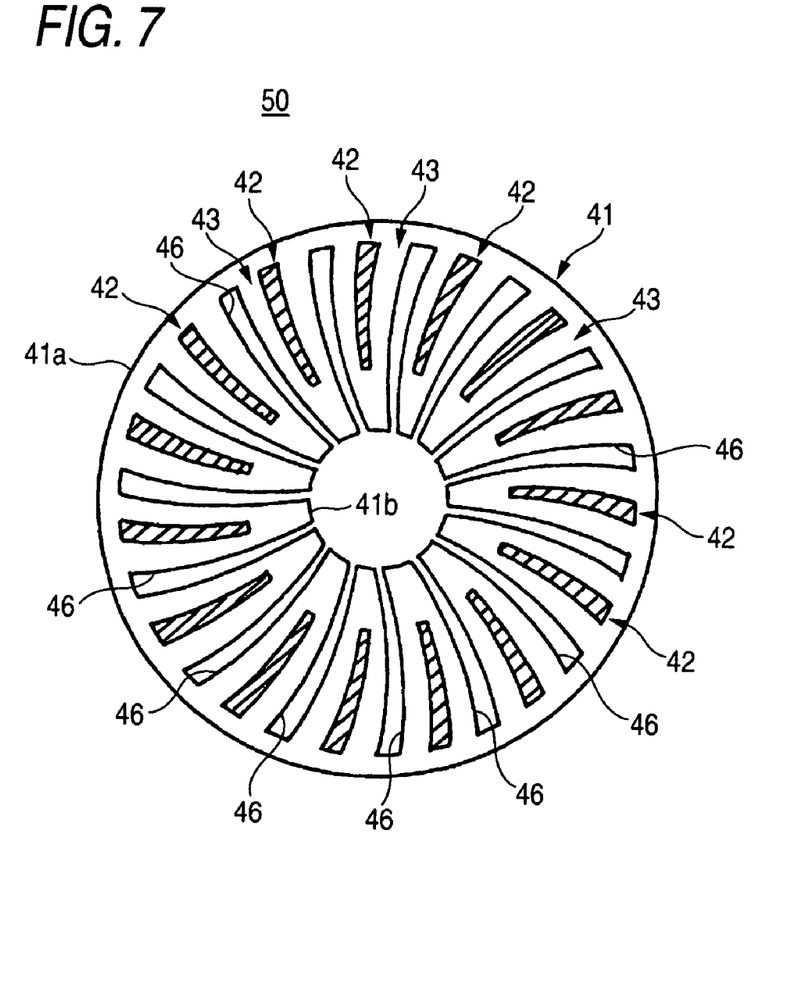
FIG. 7 is an explanatory plan view schematically showing a fourth embodiment of the master carrier for magnetic transfer of the invention.

Next described is a fourth embodiment of the invention. FIG. 7 is an explanatory plan view schematically showing a fourth embodiment of the master carrier for magnetic transfer of the invention.

As in FIG. 7, the master carrier 50 of this embodiment is so designed that the support 41 thereof has slits 36 each running through in the direction of the thickness of the support 41 and extending radially from the inner peripheral edge 41b of the support 41 toward the outer peripheral edge 41a thereof. The slits 46 each function as a relief.

In this embodiment, the site of the support 41 where the slits 46 are formed is not so rigid as compared with the other site thereof where the slits 46 are not formed, like in the third embodiment mentioned above. In addition, since the inner peripheral edge 41b of the support 41 is cut by the slits 46 at predetermined intervals in the peripheral direction thereof, the warp or distortion that may occur in the support 41 may be more efficiently relieved, and therefore the deformation to be caused by the warp or distortion is prevented from propagating to the transfer region 42. Accordingly, the master carrier 50 may be kept in uniform and intimate contact with the magnetic recording medium 20 attached thereto (see FIG. 2).

In this embodiment, the support 41 may be processed to have the slits 46 in such a condition that the non-transfer region 43 of the support 41 is removed to form the slits 46 while the outer peripheral edges 41a is left as such, within a range where the thus-slit support 41 can still ensure the minimum necessary mechanical strength thereof.

In the third and fourth embodiments, the slits 36, 46 are formed to cut the outer peripheral edge 31a or the inner peripheral edge 41b of the support 31 or 41 at predetermined intervals in the peripheral direction of the support. Not limited to these, some but not all of the slits 36, 46 may run through the outer peripheral edge 31a or the inner peripheral edge 41b in the radial direction of the support while the others do not. However, it is desirable that all the slits 36, 46 run through the outer peripheral edge 31a or the inner peripheral edge 41b in the radial direction of the support, as in the third and fourth embodiments illustrated herein. This is because, when the master carrier 40 or 50 of the preferred embodiments is kept in intimate contact with the magnetic recording medium 20 (see FIG. 2), then air may pass through the slits 36, 46 not staying between the two, and the intimate contact of the two may be ensured.

The invention should not be limited to the above-mentioned embodiments, and may be modified and improved in any desired manner.

For example, the relief is not limited to those in the above-mentioned embodiments, and may have any desired shape so far as it is effective for lowering the rigidity of the site around it than in any other site of the support.

In the above-mentioned embodiments, for example, the relieves are all formed radially in the in-plane direction of the support. Not limited to these, they may be formed in the peripheral direction of the support so far as they do not interfere with the transfer region of the master carrier. However, the radial relieves may absorb the warp and distortion of the support more efficiently, therefore preventing the support from deforming, and they are more effective for further improving the intimate contact of the master carrier to the magnetic recording medium attached thereto.

For example, in the above-mentioned embodiments, the relieves are formed in the surface of the support opposite to the surface thereof coated with a magnetic layer. Not limited to these, recesses maybe formed in the same surface of the support coated a magnetic layer in such a manner that they do not interfere with the site of the master carrier where the transfer pattern is formed.

The present invention claims foreign priority based on Japanese Patent application no. 2003-280404, filed on Jul. 25, 2003, the contents of which is incorporated herein by reference.

What is claimed is:

1. A master carrier for magnetic transfer, comprising: a support having an uneven transfer pattern on a surface of said support, said uneven transfer pattern corresponding to information to be transferred to a magnetic recording medium; and a magnetic layer on said surface of said support, wherein said master carrier has a relief in a site where said uneven transfer pattern is not provided in a perpendicular direction of said master carrier at opposite sides of said surface having said uneven transfer pattern, said relief having a thickness less than said master carrier; and a thickness of said master carrier in said relief gradually decreases with extending to outside in a radial direction.

2. The master carrier for magnetic transfer as claimed in claim 1, wherein said relief extends from inside to outside in a radial direction of said master carrier.

3. The master carrier for magnetic transfer as claimed in claim 1, wherein said relief spreads with extending to outside in a radial direction.

4. A master carrier for magnetic transfer, comprising: a support having an uneven transfer pattern on a surface of said support, said uneven transfer pattern corresponding to information to be transferred to a magnetic recording medium; and a magnetic layer on said surface of said support, wherein said master carrier has a relief in a site where said uneven transfer pattern is not provided in a perpendicular direction of said master carrier at opposite sides of said surface having said uneven transfer pattern, said relief having a thickness less than said master carrier; and a thickness of said master carrier in said relief gradually increases with extending to outside in a radial direction.

5. The master carrier for magnetic transfer as claimed in claim 4, wherein said relief extends from inside to outside in a radial direction of said master carrier.

6. The master carrier for magnetic transfer as claimed in claim 4, wherein said relief spreads with extending to outside in a radial direction.

* * * * *